United States Patent
Segev et al.

(10) Patent No.: US 12,299,167 B2
(45) Date of Patent: May 13, 2025

(54) TECHNIQUES FOR DATA CLASSIFICATION AND FOR PROTECTING CLOUD ENVIRONMENTS FROM CYBERSECURITY THREATS USING DATA CLASSIFICATION

(71) Applicant: Cyera, Ltd., Tel Aviv (IL)

(72) Inventors: Yotam Segev, New York, NY (US); Itamar Bar-Ilan, Tel Aviv (IL); Yonatan Itai, Tel Aviv (IL); Shiran Bareli, Tel Aviv (IL); Michael Elazar, Ramat Gan (IL); Antony Timchenko, Modiin (IL); Itay Mizeretz, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 204 days.

(21) Appl. No.: 18/046,204

(22) Filed: Oct. 13, 2022

(65) Prior Publication Data

US 2024/0126918 A1 Apr. 18, 2024

(51) Int. Cl.
*G06F 21/62* (2013.01)
*G06F 21/54* (2013.01)
*G06F 21/57* (2013.01)

(52) U.S. Cl.
CPC .......... *G06F 21/6245* (2013.01); *G06F 21/54* (2013.01); *G06F 21/577* (2013.01)

(58) Field of Classification Search
CPC ..... G06F 21/6245; G06F 21/54; G06F 21/577
See application file for complete search history.

(56) References Cited

U.S. PATENT DOCUMENTS

| | | | |
|---|---|---|---|
| 8,280,830 B2 | 10/2012 | Kennedy | |
| 9,172,629 B1 * | 10/2015 | McRae | H04L 45/00 |
| 9,349,102 B2 | 5/2016 | Sen et al. | |
| 9,519,868 B2 | 12/2016 | Criminisi et al. | |
| 10,095,778 B2 | 10/2018 | Barney | |
| 10,552,663 B2 | 2/2020 | Smith et al. | |
| 10,810,317 B2 * | 10/2020 | Williamson | G06F 21/604 |
| 10,817,619 B1 * | 10/2020 | Kolli | G06F 21/552 |
| 11,106,703 B1 | 8/2021 | Enuka et al. | |
| 11,531,931 B2 | 12/2022 | Enuka et al. | |

(Continued)

FOREIGN PATENT DOCUMENTS

WO 2020220544 A1 11/2020

*Primary Examiner* — Yonas A Bayou
(74) *Attorney, Agent, or Firm* — M&B IP Analysts, LLC

(57) ABSTRACT

Techniques for data classification. A method includes sampling a dataset into first and second samples. Each first sample is a numerical value, and each second sample is a string of characters. A truth table is applied to the first samples from a dataset. The truth table includes multiple first columns, each of which accepts an input value determined for each of the first samples, and a second column which outputs first scores representing likelihoods for respective classifications. Classifiers are applied to features extracted from the second samples, where each classifier is a machine learning model trained to output a second score representing a likelihood for a respective classification for each second sample. Classifications are determined based on the first and second scores. The classifications include a classification for each first sample determined based on the first scores and a classification for each second sample determined based on the second scores.

25 Claims, 7 Drawing Sheets

(56) References Cited

U.S. PATENT DOCUMENTS

| | | | |
|---|---|---|---|
| 11,755,766 B2* | 9/2023 | Kulkarni | G06F 21/6227 |
| | | | 726/26 |
| 2016/0283735 A1* | 9/2016 | Wang | G06F 21/6254 |
| 2016/0283738 A1* | 9/2016 | Wang | G06N 20/00 |
| 2020/0042636 A1* | 2/2020 | Routray | H04L 63/1425 |
| 2020/0050966 A1 | 2/2020 | Enuka et al. | |
| 2020/0162496 A1* | 5/2020 | Medalion | H04L 63/1416 |
| 2020/0311414 A1 | 10/2020 | Enuka et al. | |
| 2021/0150056 A1 | 5/2021 | Vax et al. | |
| 2021/0256156 A1 | 8/2021 | Enuka et al. | |
| 2022/0014547 A1 | 1/2022 | Hasan | |
| 2022/0030009 A1 | 1/2022 | Hasan | |
| 2022/0050917 A1* | 2/2022 | Jiang | G06F 21/577 |

* cited by examiner

TECHNIQUES FOR DATA CLASSIFICATION AND FOR PROTECTING CLOUD ENVIRONMENTS FROM CYBERSECURITY THREATS USING DATA CLASSIFICATION

TECHNICAL FIELD

The present disclosure relates generally to cloud computing data management, and more specifically to classifying data stored in data stores of cloud computing environments.

BACKGROUND

Knowing the locations of sensitive or potentially sensitive data within a cloud computing environment is very useful for identifying and prioritizing potential flaws in security of the cloud computing environment. To this end, the ability to distinguish among different types of data is particularly relevant for defending cloud environments against cybersecurity threats. Thus, how to classify data, and more specifically how to classify data in large environments with hundreds of thousands or millions of files, presents a significant challenge to operators of cloud computing environments.

In particular, certain types of data are sensitive in the sense that they could, either on their own or in combination with other data, reveal private or confidential information about a person or legal entity. Examples of sensitive data include personal data, financial data, health data, security and information technology (IT) data, business and intellectual property data, and the like.

Such sensitive data may be a higher priority for protecting via cybersecurity measures than non-sensitive data. Applicable rules, laws, regulations, or practices may also demand that additional measures are taken to protect sensitive data. Thus, identifying where and in which format such sensitive data is stored is crucial to appropriately protecting a cloud environment.

In particular, there may be certain requirements that must or should be met with respect to components containing sensitive data. Securing a cloud environment against cybersecurity threats may therefore include ensuring that these components containing sensitive data are configured or otherwise deployed in accordance with such requirements. Additionally, there may be certain expectations of how those components containing sensitive data should behave such that deviations from those expected behaviors are indicative of a potential cyber threat to the cloud environment which may result in the unauthorized exposure of sensitive data.

Additionally, existing solutions typically require obtaining permission to access each data store in a cloud environment, and such access is usually realized through a server or agent deployed in the same cloud environment that is connected to a network in which the data store is located. These existing solutions require manually identifying and granting permission for each data store, which is cumbersome. Moreover, these solutions can only protect data stores that the cloud environment owner is aware of. Since cloud environment owners do not always maintain a fully comprehensive list of data stores in the cloud environment and retrieving this information requires a high degree of technical expertise, these solutions may fail to analyze data in data stores which are deployed in the cloud environment. Consequently, data may remain unclassified in those missed data stores.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for data classification. The method comprises: sampling a dataset into at least one first sample and at least one second sample, wherein each of the at least one first sample is a numerical value, wherein each of the at least one second sample is a string of characters; applying a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification; applying at least one classifier to features extracted from the at least one second sample, wherein each classifier is a machine learning model trained to output a second score representing a likelihood for a respective classification for each of the at least one second sample; and determining a plurality of classifications based on the at least one first score and the at least one second score, wherein the plurality of classifications includes a classification for each of the at least one first sample determined based on the at least one first score and a classification for each of the at least one second sample determined based on the at least one second score.

Certain embodiments disclosed herein also include a non-transitory computer readable medium having stored thereon causing a processing circuitry to execute a process, the process comprising: sampling a dataset into at least one first sample and at least one second sample, wherein each of the at least one first sample is a numerical value, wherein each of the at least one second sample is a string of characters; applying a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification; applying at least one classifier to features extracted from the at least one second sample, wherein each classifier is a machine learning model trained to output a second score representing a likelihood for a respective classification for each of the at least one second sample; and determining a plurality of classifications based on the at least one first score and the at least one second score, wherein the plurality of classifications includes a classification for each of the at least one first sample determined based on the at least one first score and a classification for each of the at least one second sample determined based on the at least one second score.

Certain embodiments disclosed herein also include a system for data classification. The system comprises: a processing circuitry; and a memory, the memory containing instructions that, when executed by the processing circuitry, configure the system to: sample a dataset into at least one first sample and at least one second sample, wherein each of the at least one first sample is a numerical value, wherein each of the at least one second sample is a string of characters; apply a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification; apply at least one classifier to features extracted from the at least one second sample, wherein each classifier is a machine learning model trained to output a second score representing a likelihood for a respective classification for each of the at least one second sample; and determine a plurality of classifications based on the at least one first score and the at least one second score, wherein the plurality of classifications includes a classification for each of the at least one first sample determined based on the at least one first score and a classification for each of the at least one second sample determined based on the at least one second score.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
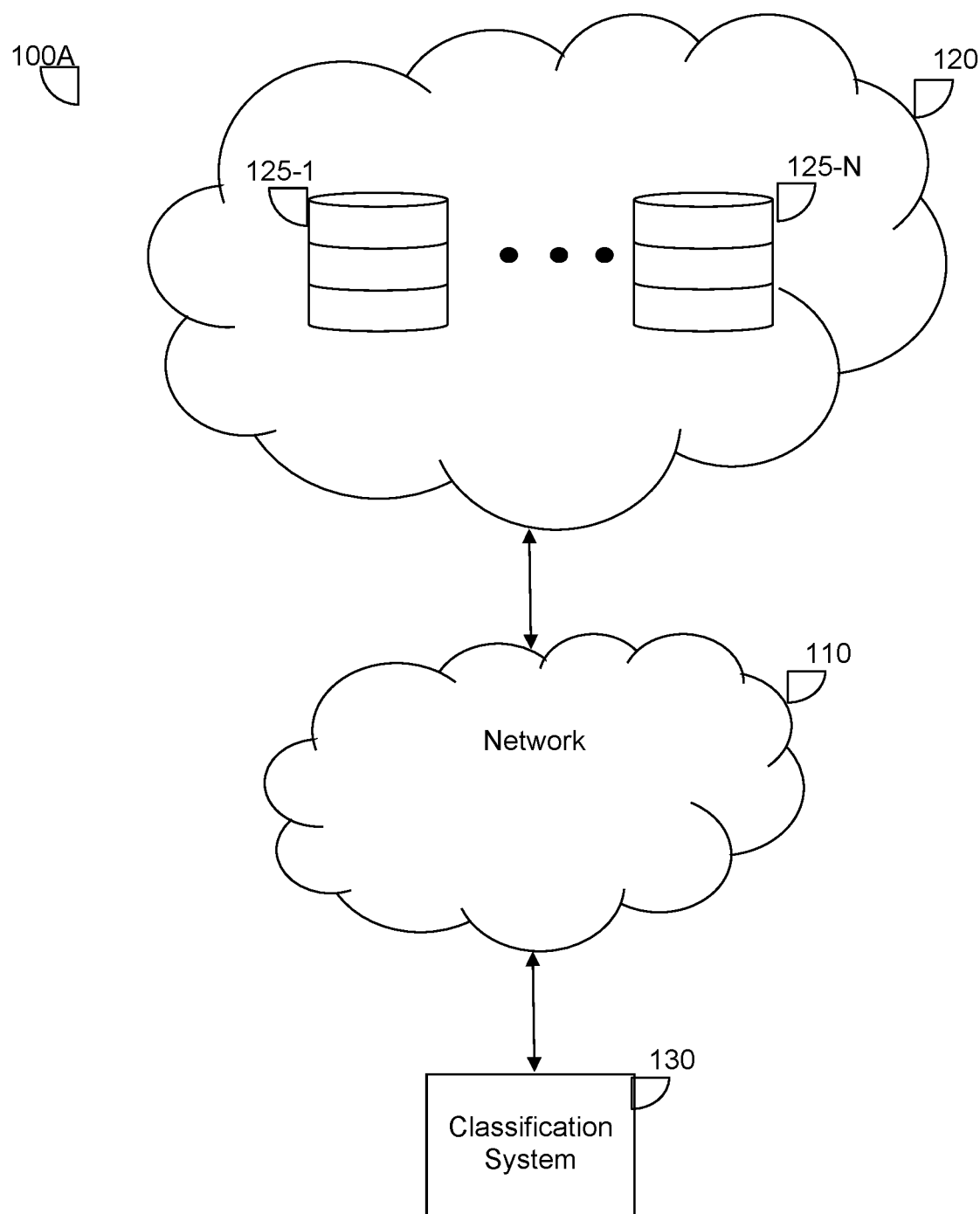
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for data classification. The disclosed embodiments can be utilized in order to identify sensitive data, particularly in large environments with significant numbers of files. In accordance with various disclosed embodiments, a heuristic process involving applying a truth table is utilized to classify certain types of data in a dataset, and a machine learning process involving applying a classifier is utilized to classify other types of data in the dataset. The truth table may be applied to samples of data which are numerical values, while the classifier may be applied to samples of data which are strings. Both the truth table and the classifier are applied in order to identify appropriate patterns within respective types of data. The outputs of the truth table and the classifier are used to determine classifications for data in the dataset. The classifications, in turn, may be utilized to identify sensitive data.

The truth table includes columns representing a set of heuristic factors as well as a column including score outputs. The heuristic factors may include the number of validated instances of each sample (e.g., instances validated using one or more validation algorithms such as LUHN validation), the strength of a regular expression of each sample, a context of each sample within the dataset, a number of samples having the same pattern as each sample, and a degree of uniqueness of each sample. The context of each sample is determined with respect to supportive terms and unsupportive terms, where supportive terms are terms that support a particular classification included in portions of the dataset that are proximate to a given sample and unsupportive terms are terms that suggest away from a particular classification included in portions of the dataset that are proximate to the sample. Additionally, classifications of other portions of the dataset may be utilized to increase or decrease a probability that a classification is accurate, thereby improving the classification further. The score outputs of the truth table each represent a respective likelihood that a particular classification is correct.

The classifier is trained to output classes for samples based on keywords extracted from those samples. Moreover, the classifier may be trained to output scores representing likelihoods of respective classes for each sample. The classifier therefore learns patterns in text that may be applied to a given dataset. The keywords input to the classifier may be extracted from portions of samples that are structured data based on fields and from portions of samples that are unstructured data based on results of natural language processing of those portions.

To support classification in accordance with the various disclosed embodiments, the disclosed embodiments further include techniques for sampling data. In particular, the sampling method to be performed may depend on the structure of the data being sampled from. More specifically, the disclosed techniques include a semi-randomization algorithm to be used for sampling from structured data and a clustering algorithm to be used for sampling from unstructured data. The semi-randomization algorithm involves dividing the structured data into chunks and then sampling from each chunk. Dividing the table into chunks and sampling from each chunk ensures that sampled data is more representative of the entire portion of data, thereby improving the accuracy of resulting classifications. Using the clustering process on unstructured data reduces the amount of computer processing needed for the data classification by allowing for identifying similar unstructured files based on file metadata (e.g., path names, file type, file size, etc.), thereby reducing the number of files that need to be retrieved (e.g., downloaded) and processed. Using natural language processing to extract certain keywords from the unstructured data allows for more accurate and efficient classification by providing structured enriched context for the unstructured data before running additional classification algorithms on the entire set of data.

Various techniques further improve the classifications. To this end, some additional techniques include a post-classification analysis which may be utilized, for example, for classifications with low scores (i.e., classifications determined to have a low likelihood of being correct). In the post-classification analysis, scores of data proximate to a given sample are analyzed, and the analysis may be utilized to confirm the low likelihood classification for the sample. If the proximate data has a high likelihood of being classified correctly, the sample is more likely to be classified correctly.

Various techniques also allow for filtering out various values which may bias or otherwise reduce the accuracy of the classification. For example, a predetermined list of mock data may be utilized to identify and filter out instances of mock data.

The classifications as described herein can further be utilized to determine roles of data in the forms of the types of owners of the data. For example, certain classes of data may represent characteristics of a customer using a service of a company, and other classes of data may represent characteristics of an employee of the company. The roles may be utilized to provide additional granularity and context to classifications, thereby improving the use of classifications for purposes such as identifying data that needs to be protected or prioritizing protection among different datasets.

FIG. 1A shows an example network diagram 100A utilized to describe various disclosed embodiments. In the example network diagram 100, a classification system 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore data in such data stores may need to be classified in order to provide certain security features to protect those data stores. To this end, the classification system 130 is configured to scan data structures in the cloud environment 120 as described herein in order to identify which of the disks 125 contain data stores, to access data in identified data stores, or both, and therefore identify where protective measures may be needed in order to protect the data stores.

Figure 1B:
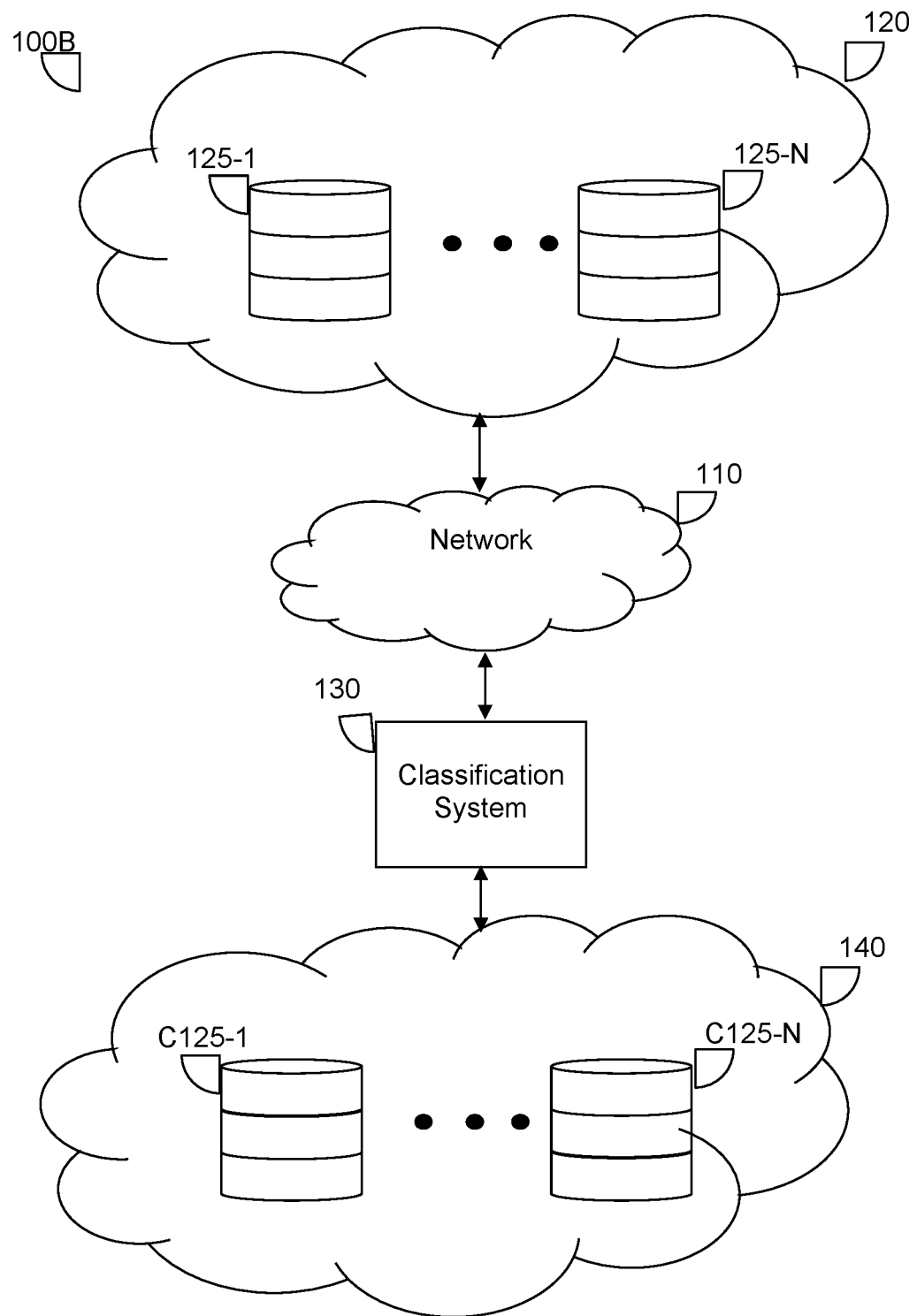

FIG. 1B further shows disk copies C125-1 through C125-N (hereinafter referred to as disk copies C125 for simplicity) that are copies of respective disks 125 which may be created in order to facilitate classification in accordance with some embodiments. The disk copies C125 are created and connected to engines (not shown) run via the classification system 130, for example via one or more virtual machines running on the classification system 130. Example techniques for copying disks which may be used to more efficiently scan disks (and, consequently, more efficiently classify data identified via such scans) are described further in U.S. patent application Ser. No. 17/647,899, assigned to the common assignee, the contents of which are hereby incorporated by reference.

It should be noted that a single classification system 130 is depicted for simplicity purposes, but that classification systems may be utilized without departing from the scope of the disclosure. Each classification system may run one or more virtual machines, each virtual machine being configured with one or more engines as described herein.

Figure 2:
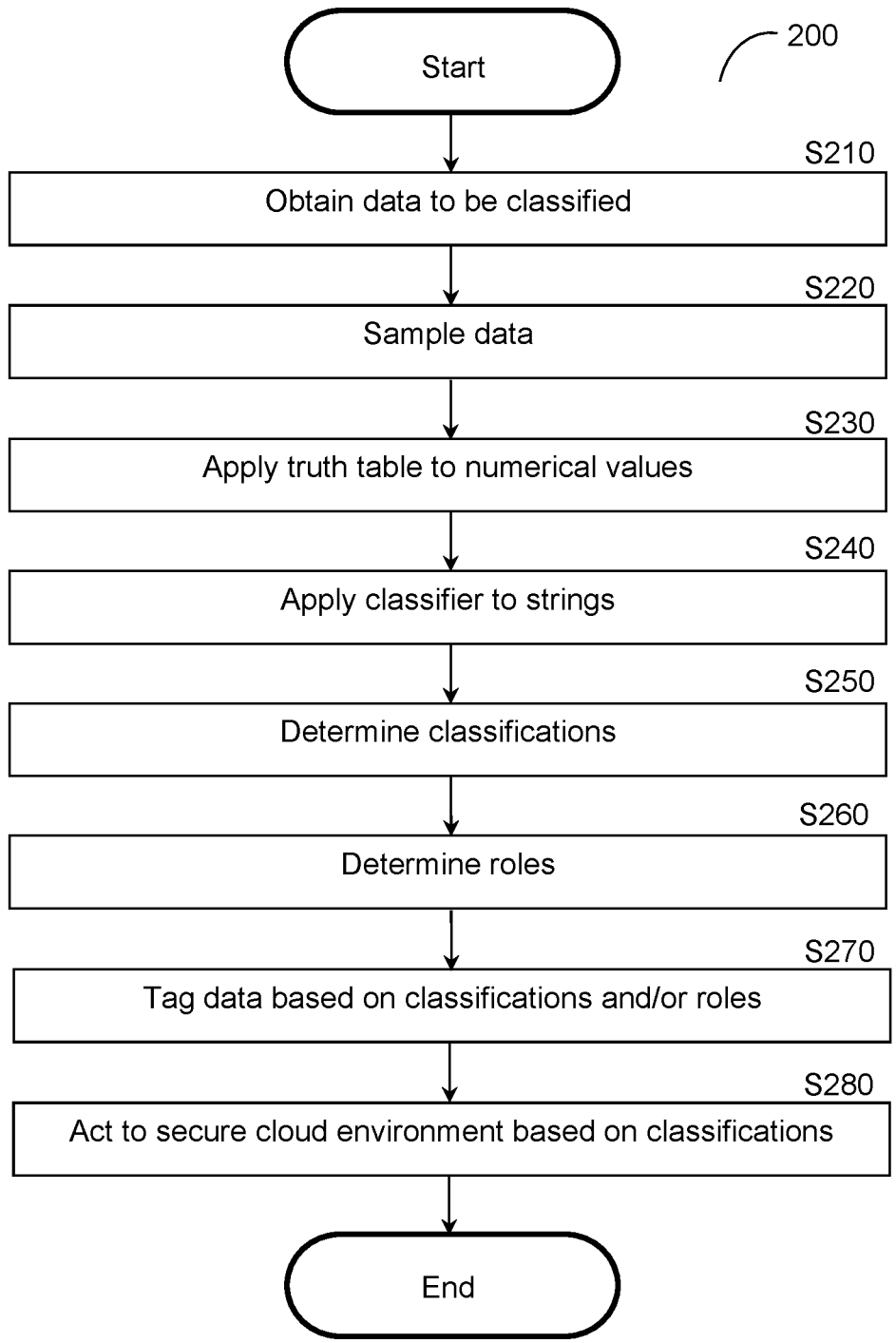
FIG. 2 is a flowchart illustrating a method for data classification according to an embodiment.

FIG. 2 is an example flowchart 200 illustrating a method for data classification according to an embodiment. In an embodiment, the method is performed by the classification system 130, FIG. 1.

At S210, data to be classified is obtained. The data to be classified is obtained from components in a cloud computing environment (also referred to as the cloud environment) and, in particular, components such as data stores deployed in the cloud environment (e.g., data stores stored in the disks 125 or the disk copies C125, FIGS. 1A-B).

At S220, the data is sampled into at least a set of first samples and a set of second samples. The first set of samples includes numerical values and the second set of samples includes strings of characters. These sets of samples are subject to different classification processes that produce more accurate classification results for different types of data, thereby improving the accuracy of classification. For example, a truth table may be applied as part of a rules-based process for numerical values (e.g., social security numbers, passport numbers, license numbers, etc.) and machine learning may be applied to analyze string values (e.g., names, addresses, geographic locations, etc.). In an embodiment, the sampling is performed as described below with respect to FIG. 3.

At S230, a truth table is applied to numerical values of the first set of samples. The truth table has columns for various input variables as well as a column containing values representing potential results of a logical operation represented by the truth table. The values for the input variables may be scores representing degrees of those variables, and may further be weighted scores. Moreover, the weighted scores may be determined using weights which are dependent on values (e.g., raw unweighted values) of other variables represented in the truth table. In an embodiment, applying the truth table involves the process described below with respect to FIG. 4.

At S240, a classifier is applied to strings of the second set of samples. In an embodiment, the classifier is a machine learning model trained to classify data into one or more classifications based on keywords extracted from the strings. The classifier allows for learning patterns from environments. In some embodiments, S240 further includes applying a name entity recognizer program in order to identify names, addresses identifiers, combinations thereof, and the like, among the data. The identified names, addresses, and identifiers may be used to identify and extract features, particularly features in unstructured data.

In some embodiments, S240 may further include applying the classifier or another classifier to the numerical values of the first set of samples in addition to applying a classifier to the strings of the second set of samples. In such an embodiment, the classifier applied to such numerical values is trained to classify data into one or more classifications based on numerical values. In a further embodiment, the classifications output when a classifier is applied to the numerical values may be utilized to verify the accuracy of the classifications output when a classifier is applied to the strings. As a non-limiting example, only classifications which match between classifications determined using numerical values and classifications determined using strings may be verified and utilized for subsequent processing.

In an embodiment, respective keywords may be extracted from different types of data (e.g., from structured data and from unstructured data). To this end, S240 may include the process described further below with respect to FIG. 5. In some embodiments, keywords extracted via NLP used to sample the data at S220 (e.g., to sample from unstructured data) may be input to the classifier at S240.

At S250, classifications are determined for different data stores based on the outputs of the truth data and the classifier with respect to data stored in each data store. In some embodiments, outputs of the truth table and the classifier may be assigned respective scores, and an aggregated score may be determined for each potential classification based on the scores for that classification determined using the outputs of the truth table and the classifier. The classifications determined at S250 may be, but are not limited to, the classifications having the highest aggregated scores (e.g., the single highest scoring classification for each data store).

At optional S260, roles of the data may be determined in order to further refine the classifications determined at S250. The determined roles may be added to the classifications for the same data, thereby improving the granularity of each classification to which a role is added.

In an embodiment, the determined roles at least include roles indicating whether the data is owned by a customer or by an employee. In other words, the determined role for a given portion of data may be indicative of the role the data serves with respect to the type of entity who owns the data. In this regard, it is noted that cybersecurity requirements according to various laws, regulations, and practices may pose different requirements depending on who owns the data. For example, consumer protection laws and best practices may differ from employee protection laws and best practices. Accordingly, determining roles for the data with respect to data ownership may further improve the granularity of the classification beyond simply identifying the type of data, which in turn allows for more accurately determining which corrective actions may need to be taken with respect to data and/or how to prioritize those corrective actions.

In an embodiment, S260 may include determining one or more new roles based on the data. The new roles are previously unidentified roles which may be unique to the source of the data. In this regard, it is noted that certain providers of cloud environments or of components in cloud environments may have their own proprietary data classes which may not be detected solely using existing classifications. In particular, such providers may have their own unique categories of data types represented by respective roles which are initially unknown. To this end, new roles may be determined using the data.

In a further embodiment, in order to determine new roles, S260 may include collecting column names of columns among the data and extracting repeating terms among those column names. The repeating terms may be identical terms or terms sharing, for example, a common prefix or suffix. To this end, at least some of the repeating terms may be identified using a dictionary of related terms (e.g., terms which are synonymous, share a prefix, share a suffix, or are otherwise conceptually related). Determining the new roles may further include analyzing fields of data within each column with a repeating term in order to further verify that the repeating terms of the columns indicate that the content of each column has a similar role to other columns with the repeating terms.

As a non-limiting example for creating a new role using repeating terms, the terms "donor" and "donation" may appear multiple times among column names of columns in the data. In columns with the term "donor" or "donation" as the column name, fields such as "donor ID," "donation amount," and "donor name" are extracted. The extracted fields are analyzed in order to verify that the fields contain terms which are also repeating terms as compared to each other and to the column names. Accordingly, a new role is determined and created as a role "Donor/Donation."

At optional S270, the data may be tagged using the classifications, roles, or both. The tags may be used for future reference in order to reduce or otherwise avoid the need to reclassify data, for example when the cloud environment changes. In this regard, it is noted that the structure of a cloud environment may change, and components within the cloud environment may also change such that they store different kinds of data over time. Maintaining tags for previously classified data allows for reducing the amount of classification processing which is required as well as allowing for analyzing correctness of cloud environment configurations more quickly than would happen if data needs to be reclassified every time the cloud environment needs to be checked for cybersecurity purposes. In an embodiment, the tags are computed using one-way functions (e.g., hash functions) such that the raw data cannot be reconstructed using the tags.

At S280, one or more actions are taken to secure the cloud environment using the determined classifications. In an embodiment, S280 includes modifying one or more components in the cloud environment based on the data classification of data stored in each component. More specifically, each component may be modified to meet one or more cybersecurity requirements with respect to the data classification of the data stored in the component.

In another embodiment, S280 may include monitoring behavior of components in the cloud environment in order to detect abnormal behaviors as potential cybersecurity threats and performing mitigation actions with respect to the detected abnormal behaviors. Specifically, the abnormal behaviors include modifying, deleting, or otherwise accessing data in one of the data stores, where the circumstances surrounding the access are unexpected for the classifications of data stored in the data store. The abnormal behaviors may be detected using a predetermined policy defining normal and/or abnormal behaviors with respect to different classifications of data. In addition to or instead of such predetermined policies, new policies may be determined by applying a machine learning engine based on analysis of the data itself and action data from the entire cloud environment using anomaly detection techniques. In a further embodiment, the mitigation actions may be prioritized based on the classifications, i.e., such that certain mitigation actions are prioritized over others and computing resources may be prioritized in order to perform the higher priority mitigation actions before lower priority mitigation actions when necessary (e.g., when insufficient resources are available to perform all mitigation actions at once).

Figure 3:
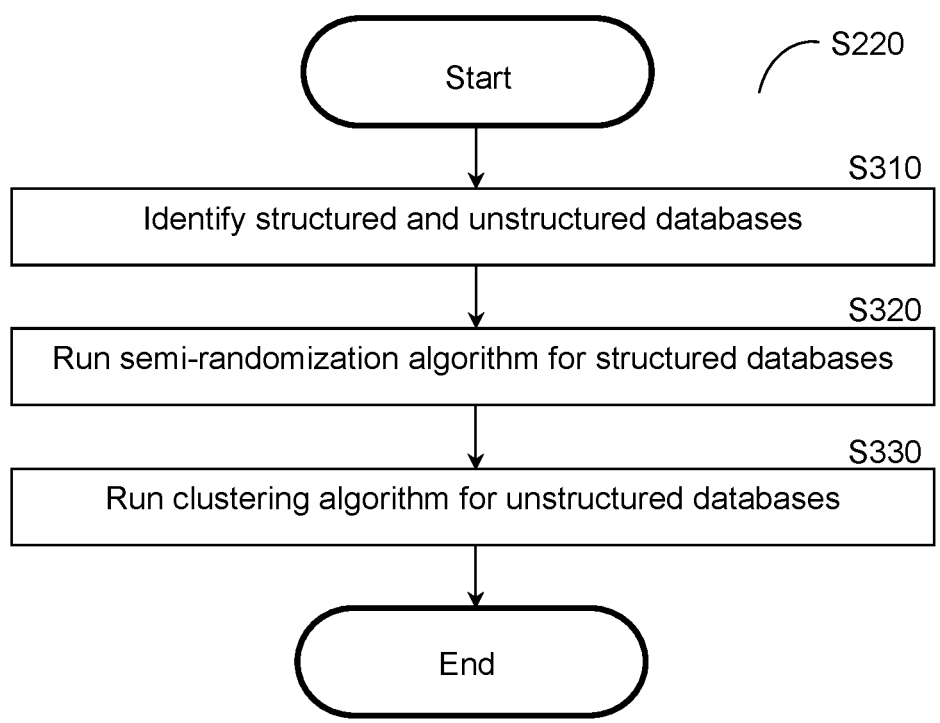
FIG. 3 is a flowchart illustrating a method for sampling data according to an embodiment.

FIG. 3 is an example flowchart S220 illustrating a method for sampling data according to an embodiment.

At S310, structured and unstructured databases are identified within data sources (e.g., within disks or copies of disks containing data). The structured databases store tabular or otherwise structured data, while the unstructured databases store non-tabular or otherwise unstructured data. It should be noted that unstructured data may also include data lacking a known structure even if the data itself is structured.

The structured and unstructured databases may be identified, for example, based on metadata indicating characteristics of various databases in the data sources. To this end, in some embodiments, databases identifying themselves as relational databases or other types of database known for including structured data may be identified as structured databases, and other databases (i.e., databases which do not identify themselves as relational or other structured databases) are identified as unstructured databases. Alternatively or in combination, databases may be identified as either structured or unstructured based on the types of data stored therein as indicated in such metadata. As a non-limiting example, a list of predetermined types of structured and unstructured data may be checked to determine whether the types of data stored in a given database are stored in a structured format or in an unstructured format.

In this regard, it has been identified that the effectiveness of sampling data (e.g., such that the samples accurately reflect the data as a whole, thereby leading to accurate classifications) can be improved by using different sampling methods for different kinds of data, particularly, unstructured and structured data. Moreover, it is noted that providing techniques for effectively and accurately sampling data allows for accurately classifying data without analyzing the entire set of data, thereby conserving computing resources. As the amount of data being stored grows exponentially, sampling becomes increasingly relevant to efficiently and quickly analyzing data.

It has been further identified that there are certain considerations for structured data which can be leveraged in order to ensure that samples taken from structured data effectively represent the structured data as a whole. More specifically, the beginning of a structured dataset typically includes test, junk, or other artificial data that is not representative of the "true" data among the dataset. Additionally, it has been identified that sampling data from only one part of a data structure (e.g., a single portion of a table) does not yield a representative sample such that it is desirable to take multiple samples from different parts of the data structures in order to improve the representation of the samples and, consequently, the accuracy of analyses using these samples. In this regard, it has been identified that a semi-randomization algorithm can be utilized to obtain samples of structured data which effectively represent the dataset as a whole.

It has also been identified that clustering algorithms can be utilized to automatically recognize patterns inside data and that, once data has been clustered, samples can be taken from each cluster such that the different samples taken from all of the clusters collectively provide an effective representation of the data as a whole. Thus, clustering algorithms may be useful in order to draw representative samples from data even when the data is unstructured.

At S320, a semi-randomization algorithm is run with respect to the structured databases. In an embodiment, S320 includes dividing data structures (e.g., columns, tables, etc.) into chunks and sampling from each chunk. As a non-limiting example, a certain number of samples (e.g., 30) may be taken from each chunk. For each sample, an entire portion of the structured data (e.g., an entire row or column) may be collected. As a non-limiting example, a sample may include a row.

In a further embodiment, the chunks from which samples are extracted may only include data from later parts of the data structure. In other words, the data from which samples are extracted may include a first portion of the data structure. As a non-limiting example, sampling from the first 100 rows in a table may be avoided such that the samples exclude data from the first 100 rows in the table.

At S330, a clustering algorithm is run with respect to the unstructured databases. In an embodiment, the clustering algorithm may use full file paths, file names, other file metadata properties (e.g., file type, file size, file extension, file encryption, last modification time, etc.), combinations thereof, and the like, for clustering purposes.

In an embodiment, S330 includes preprocessing the unstructured data, transforming full file paths into vectors, measuring distances between the created vectors (e.g., using a K-means algorithm), filtering out small clusters (e.g., having sizes below a threshold), combinations thereof, and the like. This results in clusters. Samples are extracted from each cluster.

In a further embodiment, S330 may also include filtering clusters with respect to variance in order to further improve the clusters thereby improving the representativeness of the resulting samples. To this end, a variance among metadata properties, such as, but not limited to, metadata (e.g., metadata indicating file names), full file paths, creators, file sizes, or a combination thereof, in each cluster may be determined. If the variance among a metadata property or combination of metadata properties for a given cluster is above a threshold, then the cluster may be filtered out. In yet a further embodiment, this filtering may be performed in stages, with each stage including filtering based on variance among a specified metadata property, and the second stage including filtering based on variance among file names within each cluster. In this regard, it is noted that full path filtering may be performed first in at least some implementations because the full file path typically includes the relevant data such that clusters are more likely to be filtered out based on full file path. Consequently, this staged approach allows for reducing the amount of clusters which must be analyzed for file name variance, thereby conserving computing resources.

In this regard, it has also been identified that clustering can be performed using keywords extracted using techniques such as natural language processing (NLP) which may be useful for classification purposes as well. Thus, clustering based on keywords extracted via NLP may allow for conserving computing resources when those same keywords are also used for classification of the sampled data. Moreover, NLP can be utilized in order to extract keywords without requiring complete similarity. Since unstructured data may contain data which is effectively the same but may be spelled or otherwise appear slightly differently, using NLP to cluster the data further improves the clustering and, consequently, the representativeness of the samples.

Figure 4:
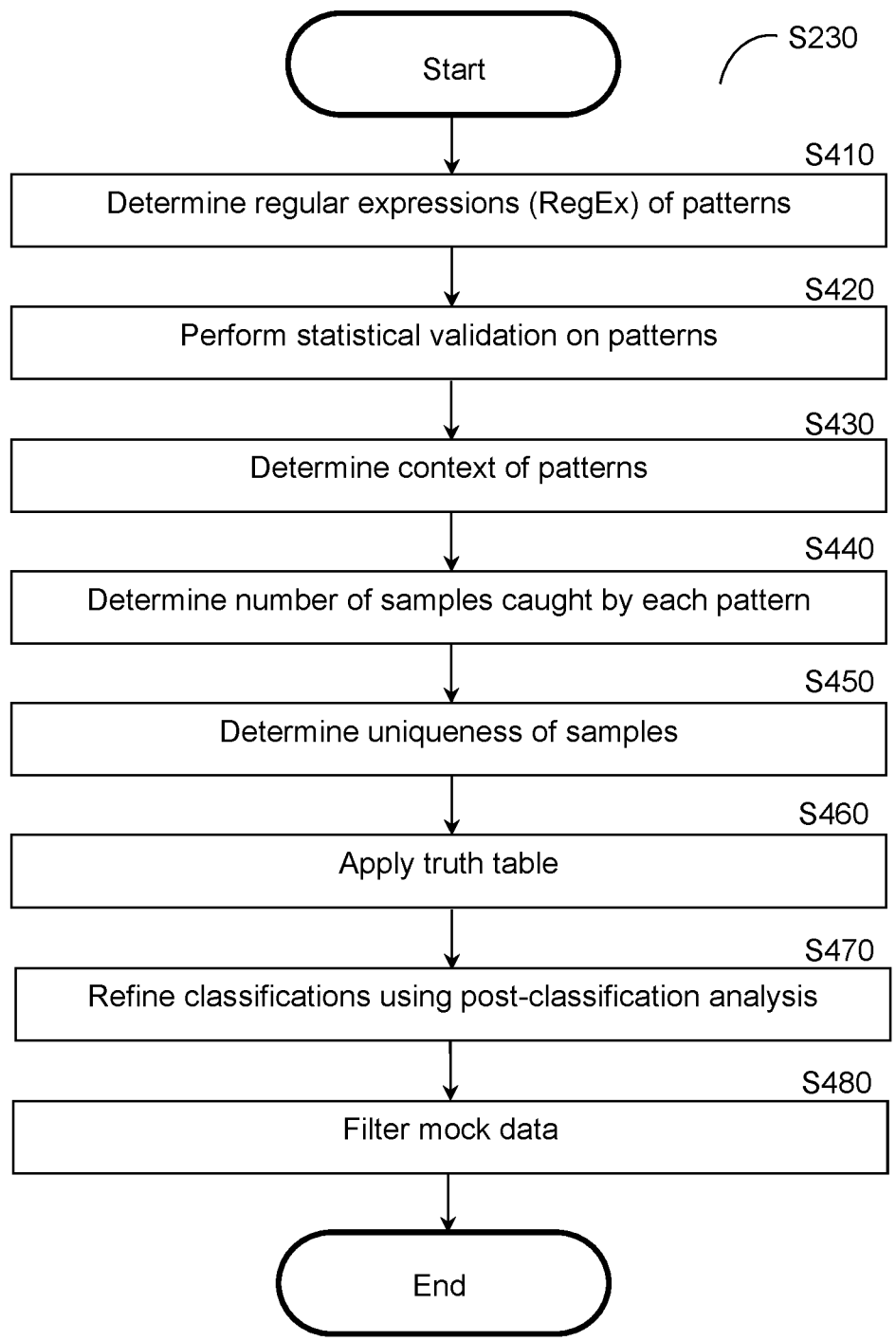
FIG. 4 is a flowchart illustrating a method for applying a truth table to classify data according to an embodiment.

FIG. 4 is an example flowchart S230 illustrating a method for applying a truth table to classify data according to an embodiment.

At S410, regular expressions (RegExes) of the patterns among the data are determined. Each regular expression is a string of text representing a potential pattern which may repeat within the data. More specifically, in an embodiment, only strong RegExes (i.e., RegExes demonstrating simple, clear patterns) are determined at S410. The RegExes to be determined at S410 may be predetermined and identified within the data. As a non-limiting example, a strong RegEx for a given type of credit card number may be "5236," which is a string of text that appears in the first 4 digits of all instances of credit card numbers issued by the same company At S420, statistical validation is performed with respect to various patterns among the data. In an embodiment, S420 includes determining how many samples were validated within a set of samples. To this end, S420 may include applying, to each sample, a validation algorithm in order to determine whether the sample represents a particular class of data. As a non-limiting example, to validate for potential credit card samples, a Luhn algorithm may be applied on the samples.

In an embodiment, the thresholds for statistical validations may be different for different potential classes of data. The thresholds to be applied may be predetermined for different potential classes of data, and may be based on factors such as, but not limited to, the length of the data. As a non-limiting example, a validation threshold of 85% may be required for social security numbers (which are shorter numbers than credit card numbers), and a validation threshold of 50% may be required for credit card numbers (which are longer than social security numbers).

At S430, a context of each of the patterns among the data is determined. The context is defined with respect to supportive terms which suggest a particular classification, negative terms which suggest away from a particular classification, or both. The supportive and negative terms may be predefined, and may be included in predefined supportive and negative term dictionaries. The supportive and negative terms may be identified, for example, within metadata or otherwise among the data.

At S440, a number of samples caught by each of the patterns among the data is determined. That is, for each repeating pattern identified among the data, a number of samples including the pattern is determined.

At S450, a uniqueness is determined for each of the samples caught by the patterns among the data. The uniqueness may be a score determined based on an amount of overlap of certain values between samples relative to the total amount of values within each sample.

At S460, a truth table is applied to the properties determined at S410 through S450 in order to determine one or more classifications for each portion of data (e.g., each sample). The truth table defines expected classifications for different combinations of values for the results of S410 through S450. Further, different features may be given more weight than others, and the weights for the features may be based on the values of other features for a given entry in the truth table.

At optional S470, a post-classification analysis is performed in order to refine the classifications determined using the truth table. To this end, S470 includes analyzing metadata, surrounding data, or both, for a given portion of data. When the post-classification analysis includes analyzing surrounding data, it may be determined whether each portion of the surrounding data was given a classification having a high likelihood of being correct (e.g., having a score above a threshold). In an embodiment, S470 may include assigning a surrounding data score to each portion of data based on the likelihood scores for the surrounding data. In some embodiments, the post-classification analysis may be performed with respect to low likelihood classifications (e.g., classifications having scores below a threshold).

In this regard, it is noted that for data classifications related to sensitivity of data, data that is in the same general area (e.g., stored within a threshold distance) tends to have the same classification. That is, if a given portion of data is surrounded by data that is sensitive, that portion of data is more likely to be sensitive even though the data itself may not appear particularly sensitive. Accordingly, analyzing the sensitivity of surrounding data allows for increasing the confidence of classifications, thereby improving the accuracy of the classifications and any decisions made based on those classifications.

At optional S480, mock data may be filtered. The mock data includes data that is utilized as an example, e.g., to demonstrate a format or structure of data stored in a data store. As a non-limiting example, the text "John Doe" is often used as an example of data illustrating a name of a person. As another non-limiting example, a mock numerical value such as "123456" may be used as an example of data illustrating a credit card number.

In an embodiment, the mock data may be identified and then filtered using a predetermined list of known mock data values. Alternatively or in combination, one or more machine learning models may be trained to identify mock data based on training data including historical examples of mock data, and the machine learning models trained to identify mock data may be applied in order to identify instances of mock data to be filtered.

Figure 5:
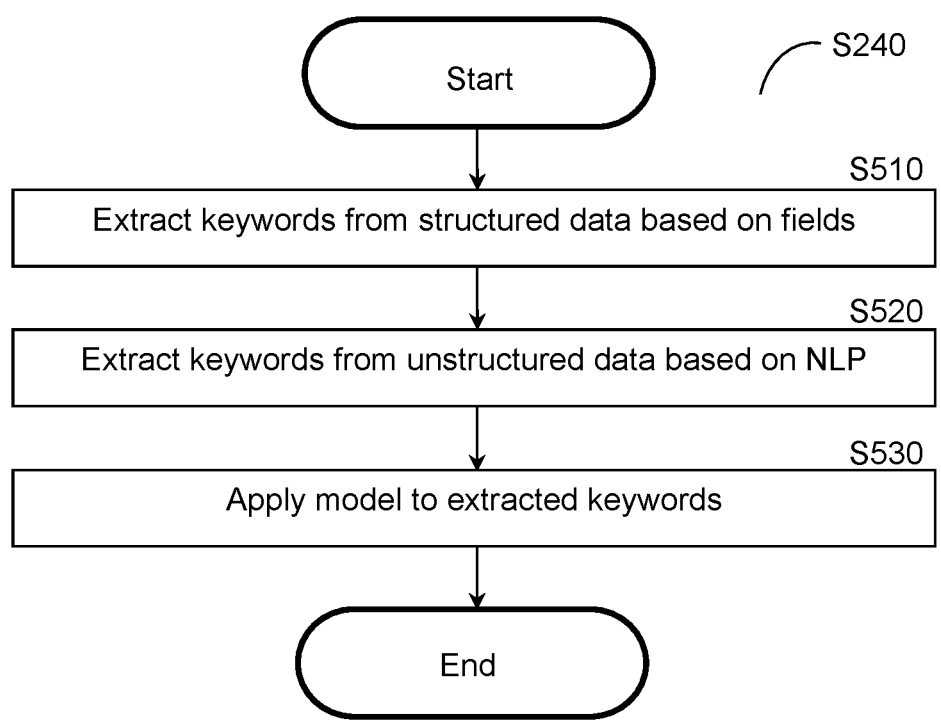
FIG. 5 is a flowchart illustrating a method for applying a classifier to classify data according to an embodiment.

FIG. 5 is an example flowchart S240 illustrating a method for applying a classifier to classify data according to an embodiment.

At S510, keywords are extracted from structured data based on fields in the structured data. In an embodiment, the keywords are extracted based on the structure of the data. In a further embodiment, the keywords are extracted with respect to fields of the structured data.

At S520, keywords are extracted from unstructured data based on results of natural language processing on the unstructured data. In an embodiment, the keywords are extracted using natural language processing (NLP). In a further embodiment, the extracted keywords may include keywords derived using NLP when sampling the data. As noted above, this allows for reusing such keywords from sampling rather than using computing resources to extract keywords again.

At S530, the classifier model is applied to the extracted keywords. The output of the classifier is one or more classifications for each portion of data (e.g., each sample) from which keywords were extracted. In some implementations, the classifications which can be output by the classifier may include a null classification or otherwise a null result may be returned when the confidence in the classification is below a threshold. In various embodiments, the classifier may further output scores representing a degree of confidence for each classification it outputs.

Figure 6:
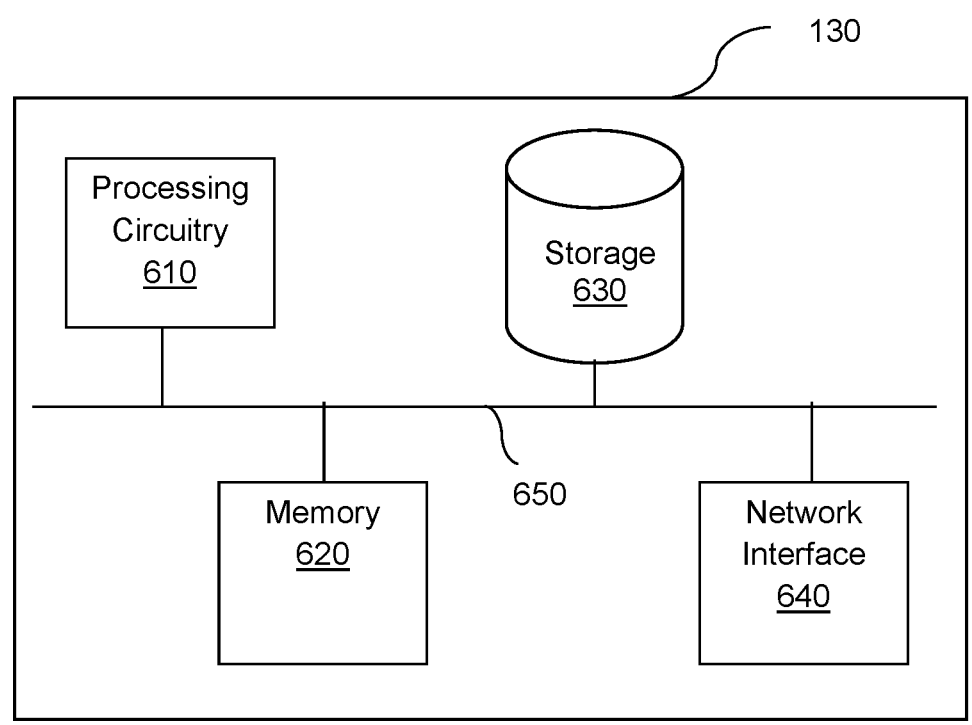
FIG. 6 is a schematic diagram of a data classifier according to an embodiment.

FIG. 6 is an example schematic diagram of a classification system 130 according to an embodiment. The classification system 130 includes a processing circuitry 610 coupled to a memory 620, a storage 630, and a network interface 640. In an embodiment, the components of the classification system 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the classification system 130 to communicate with, for example, the cloud environment 120 (particularly, the disks 125 and the copy disks C125 in the cloud environment 120).

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for data classification, wherein the method is performed via at least one system, each system having a processing circuitry and a memory, the memory of each system containing instructions that configure the system to perform at least a portion of the method when executed, comprising:
    sampling a dataset into at least one first sample and at least one second sample, wherein each of the at least one first sample is a numerical value, wherein each of the at least one second sample is a string of characters;
    applying a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification;
    applying at least one classifier to features extracted from the at least one second sample, wherein each classifier is a machine learning model trained to output a second score representing a likelihood for a respective classification for each of the at least one second sample; and
    determining a plurality of classifications based on the at least one first score and the at least one second score, wherein the plurality of classifications includes a classification for each of the at least one first sample determined based on the at least one first score and a classification for each of the at least one second sample determined based on the at least one second score.

2. The method of claim 1, further comprising:
    determining a type of owner for each of the at least one first sample and each of the at least one second sample based on the determined classifications.

3. The method of claim 2, further comprising:
    tagging the dataset using the determined type of owner for each sample.

4. The method of claim 2, wherein determining the plurality of classifications further comprises:
    creating a new class for the dataset based on a word root identified in a plurality of samples among the at least one first sample and the at least one second sample.

5. The method of claim 1, wherein determining a classification for each of the at least one first sample and a classification for each of the at least one second sample further comprises:
    identifying at least one third sample having a respective score below a threshold from the at least one first sample and the at least one second sample; and determining, for each of the at least one third sample, a third score based on the scores determined for samples within a threshold distance of the third sample in the dataset, wherein the classification for each of the at least one third sample is determined based further on the respective third score.

6. The method of claim 1, further comprising:
filtering at least one mock data sample from the at least one first sample and the at least on second sample, wherein each mock data sample includes a predetermined mock data value.

7. The method of claim 1, wherein the dataset includes structured data and unstructured data, further comprising:
running a semi-randomization algorithm on the structured data; and
running a clustering algorithm on the unstructured data, wherein the at least one first sample and the at least one second sample are generated based on an output of the semi-randomization algorithm and an output of the clustering algorithm.

8. The method of claim 1, wherein the input values for the at least two first columns of the truth table include a number of statistically validated samples, a regular expression strength, a contextual indicator, a number of samples sharing a pattern, and a degree of uniqueness of the sample.

9. The method of claim 1, wherein the input values for the at least two first columns of the truth table include a contextual indicator, further comprising:
determining, for each of the at least one first sample, whether at least one term within a threshold distance of the first sample in the dataset is a supportive term supporting a particular classification or an unsupportive term suggesting away from a particular classification; and
determining the contextual indicator for each of the at least one first sample based on at least one of: supportive terms determined for the first sample, and unsupportive terms for the first sample.

10. The method of claim 1, further comprising:
modifying at least one component in a cloud environment based on the data classification of data stored in each component, wherein each component is modified to meet at least one cybersecurity requirement with respect to the data classification of the data stored in the component.

11. The method of claim 1, further comprising:
monitoring behavior of at least one component in a cloud environment based on the data classification of data stored in each component;
detecting a potential cybersecurity vulnerability based on the monitored behavior; and
performing at least one mitigation action with respect to the detected potential cybersecurity vulnerability.

12. The method of claim 11, wherein the at least one mitigation action is prioritized based on the data classification of data stored in each component.

13. A non-transitory computer readable medium having stored thereon instructions for causing a processing circuitry to execute a process, the process comprising:
sampling a dataset into at least one first sample and at least one second sample, wherein each of the at least one first sample is a numerical value, wherein each of the at least one second sample is a string of characters;
applying a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification;
applying at least one classifier to features extracted from the at least one second sample, wherein each classifier is a machine learning model trained to output a second score representing a likelihood for a respective classification for each of the at least one second sample; and
determining a plurality of classifications based on the at least one first score and the at least one second score, wherein the plurality of classifications includes a classification for each of the at least one first sample determined based on the at least one first score and a classification for each of the at least one second sample determined based on the at least one second score.

14. A system for classifying data in cloud computing environments, comprising:
a processing circuitry; and
a memory, the memory containing instructions that, when executed by the processing circuitry, configure the system to:
sample a dataset into at least one first sample and at least one second sample, wherein each of the at least one first sample is a numerical value, wherein each of the at least one second sample is a string of characters;
apply a truth table to the at least one first sample from a dataset, wherein the truth table includes a plurality of columns including at least two first columns and a second column, wherein each of the first columns accepts an input value determined for each of the at least one first sample, wherein the second column outputs at least one first score, each first score representing a likelihood for a respective classification;
apply at least one classifier to features extracted from the at least one second sample, wherein each classifier is a machine learning model trained to output a second score representing a likelihood for a respective classification for each of the at least one second sample; and
determine a plurality of classifications based on the at least one first score and the at least one second score, wherein the plurality of classifications includes a classification for each of the at least one first sample determined based on the at least one first score and a classification for each of the at least one second sample determined based on the at least one second score.

15. The system of claim 14, wherein the system is further configured to:
determine a type of owner for each of the at least one first sample and each of the at least one second sample based on the determined classifications.

16. The system of claim 15, wherein the system is further configured to:
tag the dataset using the determined type of owner for each sample.

17. The system of claim 15, wherein the system is further configured to:
create a new class for the dataset based on a word root identified in a plurality of samples among the at least one first sample and the at least one second sample.

18. The system of claim 14, wherein the system is further configured to:
identify at least one third sample having a respective score below a threshold from the at least one first sample and the at least one second sample; and
determine, for each of the at least one third sample, a third score based on the scores determined for samples within a threshold distance of the third sample in the dataset, wherein the classification for each of the at least one third sample is determined based further on the respective third score.

19. The system of claim 14, wherein the system is further configured to:
filter at least one mock data sample from the at least one first sample and the at least on second sample, wherein each mock data sample includes a predetermined mock data value.

20. The system of claim 14, wherein the dataset includes structured data and unstructured data, wherein the system is further configured to:
run a semi-randomization algorithm on the structured data; and
run a clustering algorithm on the unstructured data, wherein the at least one first sample and the at least one second sample are generated based on an output of the semi-randomization algorithm and an output of the clustering algorithm.

21. The system of claim 14, wherein the input values for the at least two first columns of the truth table include a number of statistically validated samples, a regular expression strength, a contextual indicator, a number of samples sharing a pattern, and a degree of uniqueness of the sample.

22. The system of claim 14, wherein the input values for the at least two first columns of the truth table include a contextual indicator, wherein the system is further configured to:
determine, for each of the at least one first sample, whether at least one term within a threshold distance of the first sample in the dataset is a supportive term supporting a particular classification or an unsupportive term suggesting away from a particular classification; and
determine the contextual indicator for each of the at least one first sample based on at least one of: supportive terms determined for the first sample, and unsupportive terms for the first sample.

23. The system of claim 14, wherein the system is further configured to:
modify at least one component in a cloud environment based on the data classification of data stored in each component, wherein each component is modified to meet at least one cybersecurity requirement with respect to the data classification of the data stored in the component.

24. The system of claim 14, wherein the system is further configured to:
monitor behavior of at least one component in a cloud environment based on the data classification of data stored in each component;
detect a potential cybersecurity vulnerability based on the monitored behavior; and
perform at least one mitigation action with respect to the detected potential cybersecurity vulnerability.

25. The system of claim 24, wherein the at least one mitigation action is prioritized based on the data classification of data stored in each component.

* * * * *